Patented Jan. 27, 1948

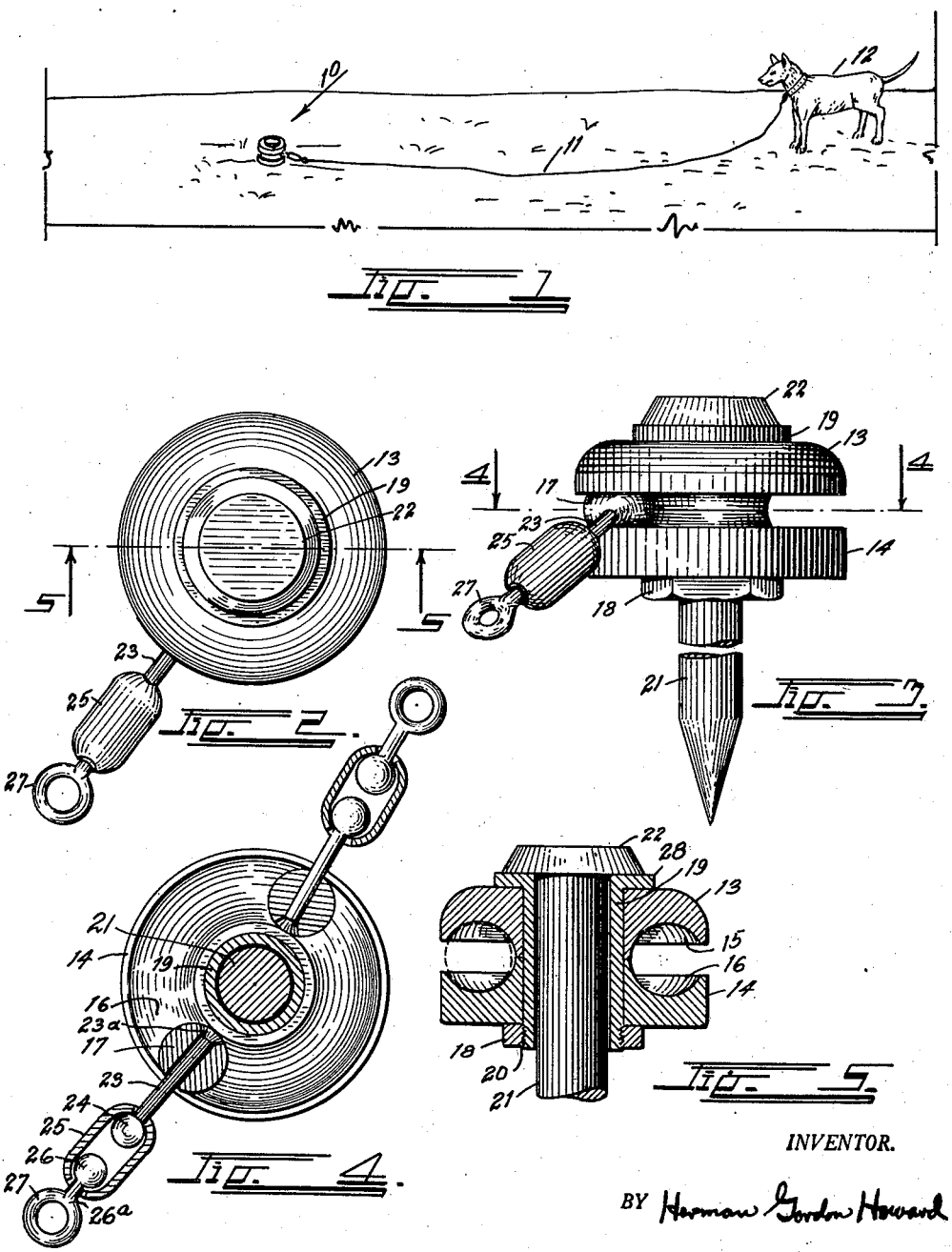

2,435,081

UNITED STATES PATENT OFFICE 2,435,081

COUPLING DEVICE

Herman Gordon Howard, Denver, Colo.

Application February 8, 1946, Serial No. 646,404

1 Claim. (Cl. 119—121)

My invention relates to a new and useful coupling device hereinafter described.

An important object of my invention is to provide a coupling device which allows continuous rotary motion within a circular arc of three hundred and sixty degrees (360°), which said coupling device may be used as shown in the drawings filed herewith, as a mechanism for tethering an animal.

Another and further important object of my invention is to provide a coupling device which will prevent the winding of the chain, or rope, or other element, by which the animal is tethered, around the stake, or pin, or other element, to which the animal is tethered, affording a maximum range of movement for the tethered animal, at all times, and protecting the animal from being choked or otherwise injured by the winding up of the element by which it is tethered around the element to which it is tethered.

A further and additional object of my invention is to provide a coupling device to which an animal may be tethered, as shown in Figure 1 of the drawings filed herewith, which automatically allows rotation in a continuous circular circumference, and which said coupling device therefore removes all cause for worry or anxiety about the animal becoming choked or entangled in the tethering element during the absence of the animal's owner.

A final object of my invention is to provide a coupling device usable as shown in Figure 4 of the drawings filed herewith, to provide a general mechanical coupling through the use of two or more coupling swivels attached to and swivelling in steel balls which said steel balls revolve in the slot of a circular steel race.

Other objects and advantages of the invention, not previously herein expressed, will be apparent during the course of the following description.

In the accompanying drawings, forming a part of this specification and in which like numerals are employed to designate like parts throughout the same, I attain the foregoing objects by a mechanism as shown, in which—

Figure 1 is an actual view of the coupling device in use having an animal tethered thereto.

Figure 2 is a plan view of the said coupling device.

Figure 3 is a side elevation view of the coupling device having a pin shown in perspective inserted therethrough for fastening purposes.

Figure 4 is a section view taken on line 4—4 of Figure 3.

Figure 5 is a cross-section view taken on line 5—5 of Figure 2.

The upper race-plate 13, the lower race-plate 14, the bushing-flange element 19, the nut 18, the ball element 17, and the swivel element represented by the numerals 23, 23a, 24, 25, 26, 26a and 27, respectively, constitute the principal parts of the coupling device, which may be constructed of steel, or other suitable material; and the pin element having a head 22 and a shaft 21. Said shaft is pointed for driving and constitutes a separable principal part to be used in combination with the said coupling device, as aforesaid, for the purposes of staking out and tethering an animal.

In the drawings, wherein for the purpose of illustration is shown a preferred embodiment of my invention, the numeral 10 designates a complete coupling device of the nature herein described which is affixed to the ground for the purpose of tethering an animal; and the numeral 11 designates any tethering element, which may consist of a rope, chain, or other appropriate and suitable tethering element; and the numeral 12 designates an animal. A dog is pictured herein, but a bull, horse, sheep, or any other animal, may be tethered in a similar appropriate manner.

The numeral 13 designates an upper plate element having an annular ball-race therein.

The numeral 14 designates a lower plate element having an annular ball-race therein.

The numeral 15 designates the upper internal surface of the annular ball-race, referred to in describing the element 13, and the numeral 16 designates the lower internal surface of the annular ball-race referred to in describing the element 14.

The numeral 17 designates a ball which is of appropriate diameter and circumference to roll freely in the annular ball race formed between the elements 13 and 14, as hereinbefore described, when assembled as shown in Figure 3 of the drawings.

The numeral 18 designates a nut, and the numeral 19 designates a bushing-flange element, which is employed to assemble the upper race-plate 13 and the lower race-plate 14 together, as shown in Figure 5 of the drawings.

The bushing-flange element 19 has an annular opening formed therein, as shown in Figure 5 of the drawings, for the passage therethrough of a fastening element, such as the element 21—22 described hereinafter. The race-plates 13 and 14, respectively, have openings in the central faces thereof for the passage therethrough of the bushing-flange element 19, as shown in Figure 5 of the drawings herewith.

The nut element 18 screws on to the bushing-flange element 19 by means of screw threads 20.

The numeral 21 designates a pin element having a head 22 thereon. The pin element 21—22 is separable from the rest of the assembled coupling device and is used for staking an animal out for purposes of grazing, ranging, or exercise.

The coupling device may be affixed to the ground by driving the pin 21—22 through the opening in the bushing-flange element 19 and thence into the ground, or into a wooden post embedded in the ground, or by other desirable and appropriate means.

The numeral 23 designates a connecting arm element of a swivel which attaches the swivel to the ball element 17.

The numerals 23, 23a, 24, 25, 26, 26a and 27 constitute the principal elements of the swivel, as shown in Figure 4 of the drawings in detail. The swivel consists of a pin 23 having a head 23a on one end thereof, adapted to swivel in ball 17, and having a ball element 24 on the opposite end thereof, an eye-like element 27 connected to a ball element 26 by a pin element 26a, and a chambered bulb-like container 25 having openings in the ends thereof in which pins 23 and 26a, respectively, are adapted to revolve freely, said ball elements 24 and 26 being adapted to swivel freely in the hollow chamber of bulb-like container 25.

The swivel is attached to the ball element 17 as shown in Figures 3 and 4 of the drawings, but is so attached at element 23a of the swivel that the ball 17 revolves independently of the swivel, and the parts of the swivel are also constructed in a manner as indicated by the drawings, so that the swivel has independent and free movement of its parts in universal directions.

The tethering element 11 is attached by any appropriate or desirable means to the ring of the swivel which is designated by numeral 27 of the drawings.

The animal 12 is attached to the tethering element by any desirable or appropriate means.

The assembled coupling device has an opening formed therein which is of sufficient breadth to allow the said swivel element, shown in the drawings, to be attached to the ball 17, in the manner shown in the said drawings, but this said opening between upper race-plate 13 and lower race-plate 14 is of such dimensions as to prevent the escape from the coupling device of the ball 17.

The coupling device and its individual parts are constructed of steel, or other suitable material, and are made of sufficient dimensions and quality to withstand the stresses and pressures to which they may be intended to be subjected.

The coupling device, herein described, may also be used as a general mechanical coupling, as mentioned in the objects hereinbefore set forth. In order to use the said coupling device as a general mechanical coupling, two balls having swivels attached respectively thereto, as heretofore described, are placed within the ball-race formed between race-plates 13 and 14, respectively, as shown in Figure 4 of the drawings.

Then, attachments can be made to the rings 27 of the swivel element, shown in the drawings. In this latter utilization of the coupling device, pin element 21—22 would not necessarily be employed, since it is used principally to attach the coupling device to some object, and further the upper race-plate 13 is assembled with the lower race-plate 14 by means of an annular bushing-flange element 19, which has a flange fitting over the upper race-plate 13 and is secured under lower race-plate 14 by means of a nut element 18, which nut element screws onto screw threads designated by the numeral 20, all substantially as shown in Figure 5 of the drawings.

When the said coupling device is used for purposes of tethering an animal, the device as assembled, is affixed by the pin 21—22 to the ground as shown in Figure 1 of the drawings, and the animal is tethered thereto, as hereinbefore described, and as shown by the drawings herewith. The said animal can run freely at full range of his tethering device, because the ball 17 turns and rolls independently within the ball-race of the coupling device, and the coupling swivel also turns and revolves freely in universal directions, independently of the ball.

It is understood that the form of my invention, herewith shown and described, is to be taken as a preferred example of the same, and that various changes in the shape, size and arrangement of parts may be resorted to, without departing from the spirit of my invention, or the scope of the subjoined claim.

Having thus described my invention, I claim:

A coupling device for tethering an animal comprising an upper and lower race plate constructed and arranged to provide a race therebetween and an opening for access to said race, each race plate being provided with a central opening, a ball in said race, a swivel element passing through said opening and attached to said ball, said swivel element being adapted to swivel in said ball, a bushing extending through the central openings of the race plates, said bushing having a flange on the upper end thereof and screw threads on the lower end, a nut threaded on said screw threads to hold the race plates in said screw threads to hold the race plates in assembled relationship between said flange and nut, and a pin element through said bushing for affixing the coupling device to a supporting surface.

HERMAN GORDON HOWARD.

REFERENCES CITED

The following references are of record in the file of this patent:

UNITED STATES PATENTS

| Number | Name | Date |
|---|---|---|
| 354,404 | Farrar | Dec. 14, 1886 |
| 1,456,627 | Delbridge | May 29, 1923 |

FOREIGN PATENTS

| Number | Country | Date |
|---|---|---|
| 11,216 | Great Britain | 1893 |
| 35,387 | Germany | Apr. 24, 1886 |